C. F. WALLACE & M. F. TIERNAN.
APPARATUS FOR PURIFYING WATER OR SEWAGE.
APPLICATION FILED MAR. 26, 1915.

1,283,993.

Patented Nov. 5, 1918.
6 SHEETS—SHEET 1.

UNITED STATES PATENT OFFICE.

CHARLES F. WALLACE, OF TOMPKINSVILLE, AND MARTIN F. TIERNAN, OF NEW YORK, N. Y.

APPARATUS FOR PURIFYING WATER OR SEWAGE.

1,283,993.  Specification of Letters Patent.  Patented Nov. 5, 1918.

Application filed March 26, 1915. Serial No. 17,122.

*To all whom it may concern:*

Be it known that we, CHARLES F. WALLACE and MARTIN F. TIERNAN, citizens of the United States, residing at Tompkinsville, borough of Richmond, city and State of New York, and New York, borough of Manhattan, county and State of New York, respectively, have invented certain new and useful Improvements in Apparatus for Purifying Water or Sewage, of which the following is a clear, full, and exact description.

This invention relates to apparatus for purifying water, sewage, etc., and it is of a type more especially adapted to the use of chlorin as the germicide. The use of chlorin for the purpose of killing the bacteria in water or sewage is well known, and it is one of the purposes of the present invention to provide especially for the handling of chlorin and the treating of water or sewage thereby, through the medium of associated parts well adapted for the purpose. Other objects are to provide simple, efficient and practical apparatus for the purpose mentioned.

There being among the objects of the present invention, the same consists of certain features of construction and combinations of parts to be hereinafter described and then claimed with reference to the accompanying drawings illustrating suitable embodiments of the invention and in which—

Fig. 9ᵃ is a modified detail of said flow meter;

Figures 1, 16:
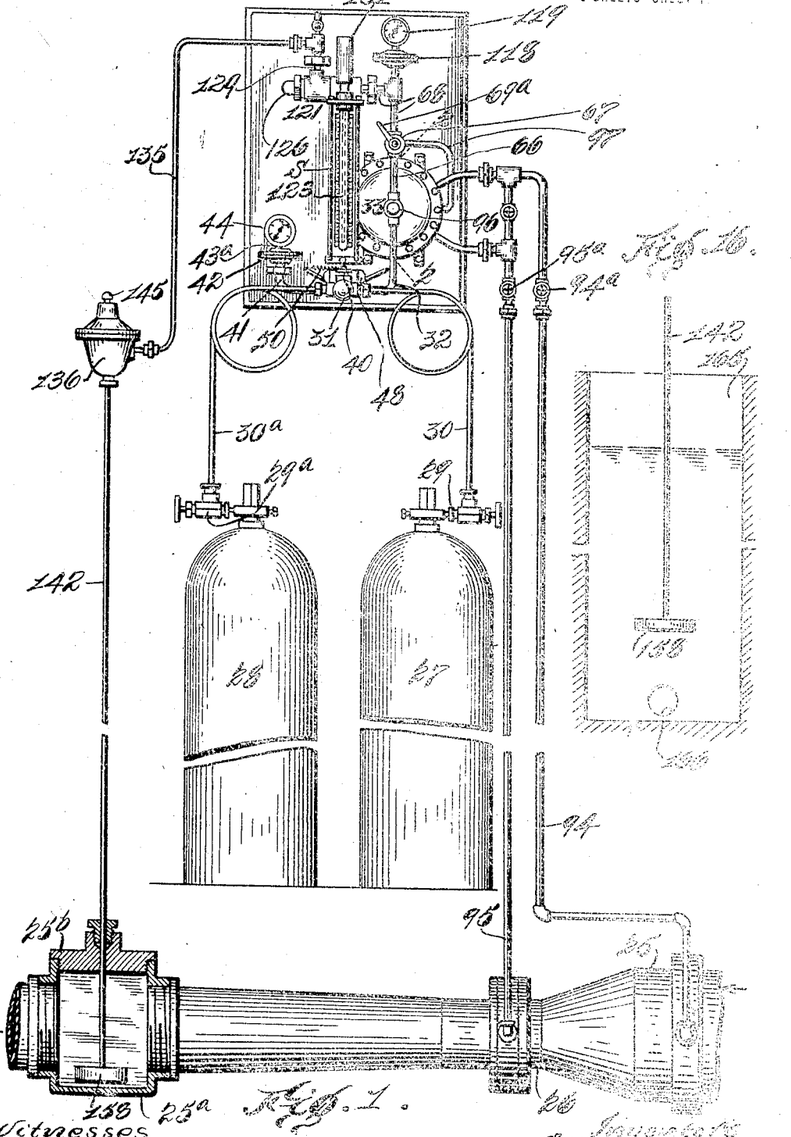
Figure 1 is a front elevation of the apparatus for use with a Venturi connection in a water-main.
Fig. 16 is a vertical section partly in elevation, illustrating a modification in which the last named device is shown as immersed in a well or tank.
Figures 5, 6, 7, 8, 9, 9A:
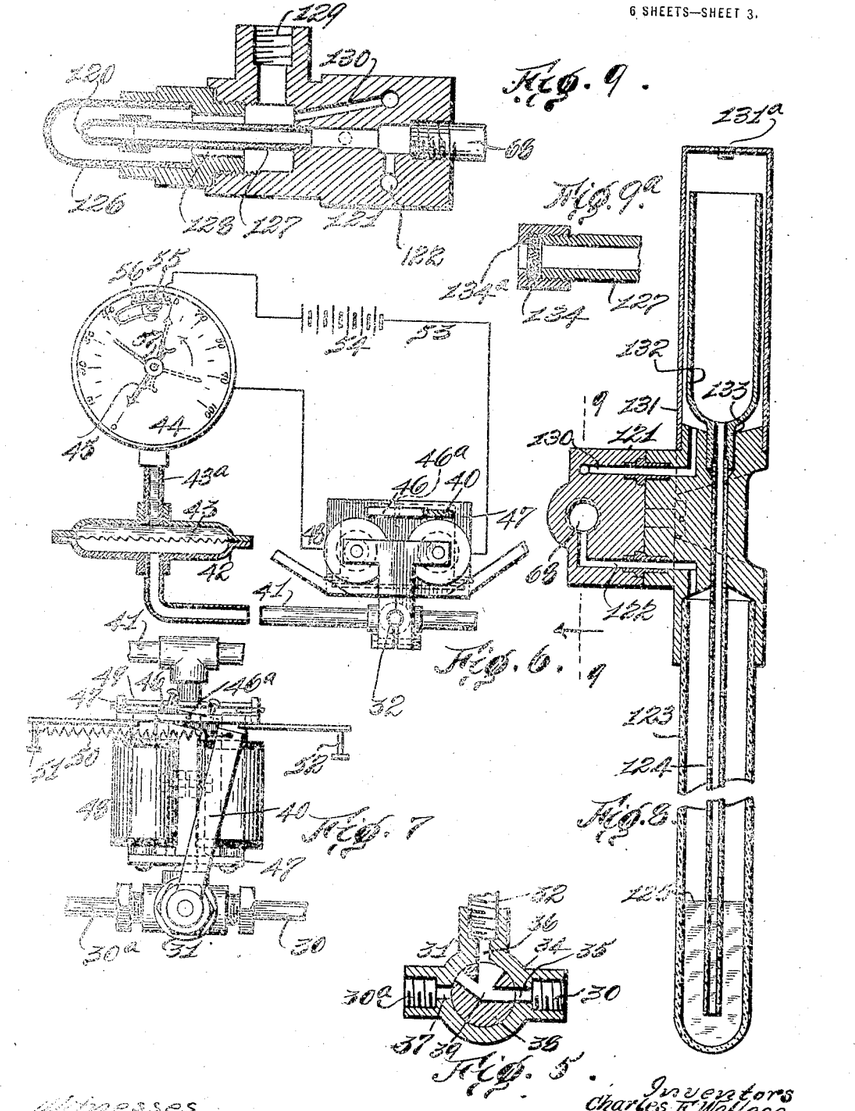
Fig. 5 is a section of a three-way valve which is preferably used where successively emptied chlorin tanks are employed.
Fig. 6 is a side elevation partly in section showing automatic means for controlling said valve to cut in a full tank when another tank has been emptied.
Fig. 7 is a plan view of an electro-magnet and associated parts illustrated in Fig. 6.
Fig. 8 is an enlarged vertical section of a manometer shown in Fig. 1.
Fig. 9 is a longitudinal section of a flow meter associated with said manometer, the section being taken on the line 9—9 Fig. 8.

A plurality of tanks containing liquid chlorin as a germicide, is preferably used, and in such a case means are employed for automatically disconnecting one tank when the gas supply is exhausted and connecting up a full tank into the system. Referring, therefore, to Fig. 1, it is assumed that water to be purified passes through a main comprising the barrel 25 of a Venturi connection, provided with a throat 26, and that two steel flasks 27, 28, each containing a charge of liquefied chlorin, are employed. These flasks or tanks are provided with valve devices 29, 29ª of well known type, for permitting of the discharge of quantities of gas so that in given periods of time the same weight of gas will be discharged. Flexible tubes 30, 30ª are connected at one end with the said valves, said tubes being fixed at their other ends and their flexibility permitting the placing of the tanks just where they are desired.

Where two tanks are used, a three-way valve 31 is preferably employed in the gas line, in which case means are provided for automatically throwing the valve so as to connect a full tank when the other tank has been emptied. The said three-way valve is shown in Fig. 5, and by means of a pipe 32 (Fig. 1), is connected with a differential pressure device 33 to be described later. Said three-way valve comprises a casing 34, provided with three ports 35, 36 and 37, the intermediate one communicating with said pipe 32. A rotary plug valve 38 is adapted to turn in said casing 34 and is provided with a three-way channel 39, the intermediate branch of which is of such cross section that it will connect a tank with pipe 32 in both of the rotated positions of said plug, one of the side branches of said channel being specifically for the right-hand tank 27 and the other for the left-hand tank 28. It will be seen that in the position shown in Fig. 5 the channel 39 of said plug 38 will permit gas to pass from the right-hand tank to the pipe 32 and thence to the differential pressure device 33, and that if the plug is rotated to the left, the right-hand tank will be cut off and the left-hand tank will be cut in, thus permitting gas to pass from said left-hand tank to said pipe 32. This action is preferably accomplished automatically, so that no special attendant is necessitated.

*Means for automatically operating three-way valve.*

Such means are indicated in Fig. 1 and are shown in detail in Figs. 6 and 7.

To the desired end, the rotary plug valve 38 carries a lever-arm 40, which is adapted to be thrown automatically from the position shown in Fig. 7 to a position to the left thereof. A pipe 41 branches off from the main gas pipe 32 and connects with a pressure chamber 42 which is provided with a septum furnished by a flexible diaphragm 43. The gas pressure in the pipe 41 is transmitted into the lower compartment of said chamber 42 so as to act upon said diaphragm 43. The upper compartment of the chamber 42 is preferably filled with oil or other suitable liquid and connects by means of a tube 43ª with the liquid chamber of a pressure gage 44, the detailed construction of which is well known. The object of the said gage is to indicate by means of the pointer or indicator 45, the pressure of gas flowing into pipe 32, to which end the said gage is provided with a graduated face. A rocking latch 46 is preferably pivoted at its mid-length at 46ª on the frame 47 of an electromagnet 48. The armature 49 is intended to actuate said latch 46 so as to release the lever 40 from said latch. When released a spring 50 pulls the lever 40 over to that side on which said spring is located. Said spring is shiftable so that it may be set to pull the lever-arm 40 either to the right or to the left, to which end the outer end of said spring is adapted to be engaged over one or the other of two pins 51, 52, located upon extensions of the magnet frame 47. If the magnet is energized, with the parts in the position shown in Fig. 7, the latch 46 will be operated to release the lever-arm 40, whereupon the spring 50 will pull said arm to the left, thus connecting tank 28 with the gas line instead of tank 27. This action is accomplished automatically when the supply of gas from tank 27 is exhausted.

To accomplish the desired result, electric power is preferably employed. A circuit 53 includes a battery 54 and said circuit is at one end connected with a post 55 insulated from the pressure gage 44 by suitable insulation. Said post 55 supports a stationary spring contact 56, which is therefore located in the battery side of the circuit, and upon the dial of said gage. The indicator 45 is grounded on the casing of the gage so that it is in the electro-magnet side of said circuit. In order to close the circuit and energize the said magnet, said indicator 45 carries a contact 57 which is of such length as to make electric connection with the fixed contact 56, when said contact 57 sweeps past it.

The operation of said automatic valve control mechanism is as follows. The indicator 45 of the pressure gage is set to a maximum gas pressure indicated by the dial, and, in setting, the said indicator carries the movable contact 57 to a point in a clockwise direction with respect to the fixed contact 56, so that said movable contact is located to the right thereof as indicated by dotted lines. If the chlorin gas is being supplied from the right-hand tank 27, the rotary plug valve 38 (Fig. 5.) will be in the position shown, and the other parts in the position shown in Fig. 7. Now, when the pressure of gas from the tank 27 becomes low, due to the exhausting of the supply of liquefied chlorin therein, the pressure on the diaphragm 43 will be reduced and the indicator 45 will be caused to turn in an anticlockwise direction, thereby sweeping the movable contact 57 across the fixed contact 56, so that the circuit will be closed and the electro-magnet 48 energized. This will cause the magnet armature 49 to be attracted, thereby operating the latch 46 and releasing and causing the operation of lever-arm 40 as before stated. When the circuit is broken the armature 49 will return, leaving the lever-arm 40 locked by the left-hand end of latch 46. The attendant now disconnects the flask or tank 27 and installs a charged flask. He also disconnects the spring 50 from the pin 51 and connects the same with the pin 52 at the right, so that when the latch is again operated the lever-arm 40 will be pulled to the right and connect up a charged flask 27 after the flask 28 has been emptied. The control device described is of course only one possible form.

Reinforced diaphragm.

Figures 10, 11:
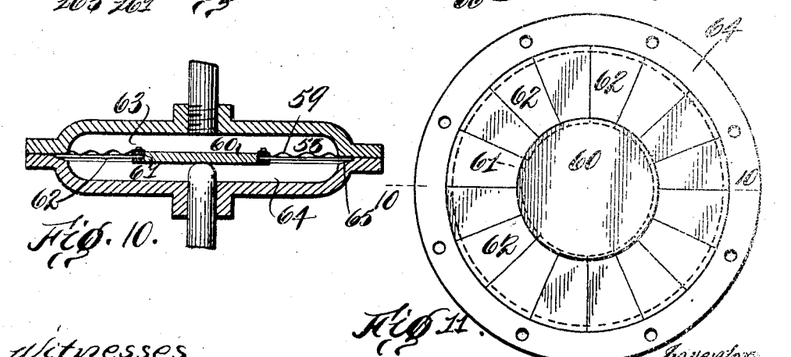
Fig. 10 is a section of a pressure transmitting device showing the preferred means of reinforcing the diaphragm thereof, the section being taken on the line 10—10 Fig. 11.
Fig. 11 is a plan view of said device.

Pressure devices or pressure-reducing devices are usually provided with a diaphragm consisting of a thin sheet of suitable material such as the diaphragm 43 shown in Fig. 6. Under present invention the use of one or more such diaphragms is preferably involved. The diaphragm is preferably thin and sensitive and is suitably reinforced to avoid danger of rupture or distortion when subjected to high pressure. Referring to Figs. 10 and 11, which show a casing which may stand for any casing of such a device, the preferred construction of reinforced diaphragm is illustrated. The diaphragm Fig. 10 is provided with corrugations 59 and a thicker central plate or disk 60. Disk 60 is provided with a peripheral groove 61 or a series of notches, and the inner edges of a series of segmental metal plates 62 are set into said groove. The chamber sections 63, 64, clamp the diaphragm 58 in position, and the section 64 is provided with an annular groove or recess 65 in its inner periphery. It will be seen that each of the series of reinforcing plates 62, against which the diaphragm is adapted to rest, tapers from its outer to its inner edge, the narrower inner edges of said plates being set into groove 61 and the wider outer edges thereof into the groove 65. Further, the adjacent edges of the said plates are in contact, so that a complete annular series of such plates is provided. In the preferred construction the bottom of the annular groove 65 is beveled or the groove otherwise enlarged, but so as to hold the extreme outer edges of said plates, while the width of the groove 61 in the disk 60 is somewhat greater than the thickness of said plates, for play. Consequently the diaphragm is free to move through a fairly large space without any friction and with almost perfect elasticity. Any great pressure put upon the diaphragm from its side of the diaphragm chamber will be withstood by the described series of reinforcing plates and thereby the rupture of the diaphragm prevented. This construction also effectually removes all tensile stress from the diaphragm, thereby permitting a thin and sensitive diaphragm to be used with high pressures.

Control valves.

Figure 12:
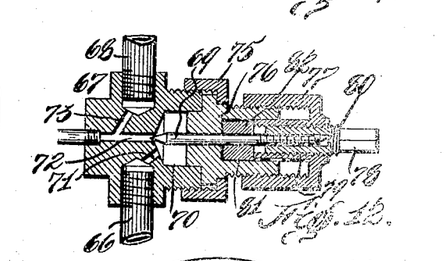
Fig. 12 is a detail of a control valve such as shown in Fig. 2.

All control valves used in this system are preferably constructed as shown in Fig. 12. The one shown is that which is directly associated with the differential pressure device 33, not yet described. As before stated main gas pipe 32 is connected with the said differential pressure device, and the outgoing pipe 66 therefrom leads to the valve casing 67 of the control valve. The outgoing pipe 68 is furthermore connected with said valve casing. A needle valve 69 is arranged in valve chamber 70 which is a screw-threaded extension or neck of valve casing 67. Said valve casing 67 is provided with a duct composed of sections 71, 72, 73 which are bored through said casing, and these ducts are adapted to connect pipe 66 with valve chamber 70 and the latter with pipe 68, while the valve end of the duct section 72 constitutes a valve seat. Screwed onto the screw-threaded chamber 70 is a nut 75 which acts in connection with the said chamber to secure a bushing 76 in such position as to guide the needle valve 69 to and from its seat. The outer end of the bushing 76 is screw-threaded to receive a gland nut 77, which acts as a support for the needle valve. The needle valve may be adjusted through the medium of a handle 69ª (Fig. 1), which handle is applied to the end of a head 78 which is screwed into an inner sleeve 79 of said gland nut. The stem of needle valve 69 has a screw-threaded end 80 which is screwed into the head 78. The pitch of the screw-thread connection between the gland nut 77 and the head 78 is greater than that of the pitch of the screw thread between the valve stem and the head 78. This provides a differential screw connection between the valve and the gland nut and enables the valve to be adjusted longitudinally, while at the same time a fine adjustment for the valve is provided, with a comparatively large rotary motion of the handle of the valve. A tongue and groove connection between the valve stem and its guide is unnecessary, inasmuch as the valve is held against rotation through the medium of a packed cavity 81 in said bushing 76, the packing 82 in said cavity being squeezed therein by the action of the gland nut when tightened up. By means of the differential screw connection a fine control of the flow of chlorin is provided.

The described control valve located as mentioned provides for a drop in pressure, and the principle of the present system, involving the same and the Venturi connection shown in Fig. 1, is that water flowing through the Venturi throat 26 from right to left causes a difference in pressure from the barrel 25 to the throat 26, said difference in pressure being in proportion to the amount of water flowing through the water main. Chlorin gas flowing across the said control valve causes a drop in pressure across such valve in substantial accordance with the formula which expresses the flow of water through the Venturi throat. The valve of the differential pressure device 33 (not yet described) will increase or decrease this flow of chlorin in direct ratio to the increased or decreased flow of water, and thus maintain a flow of chlorin proportional to the flow of water.

*Differential pressure device.*

Figure 2:
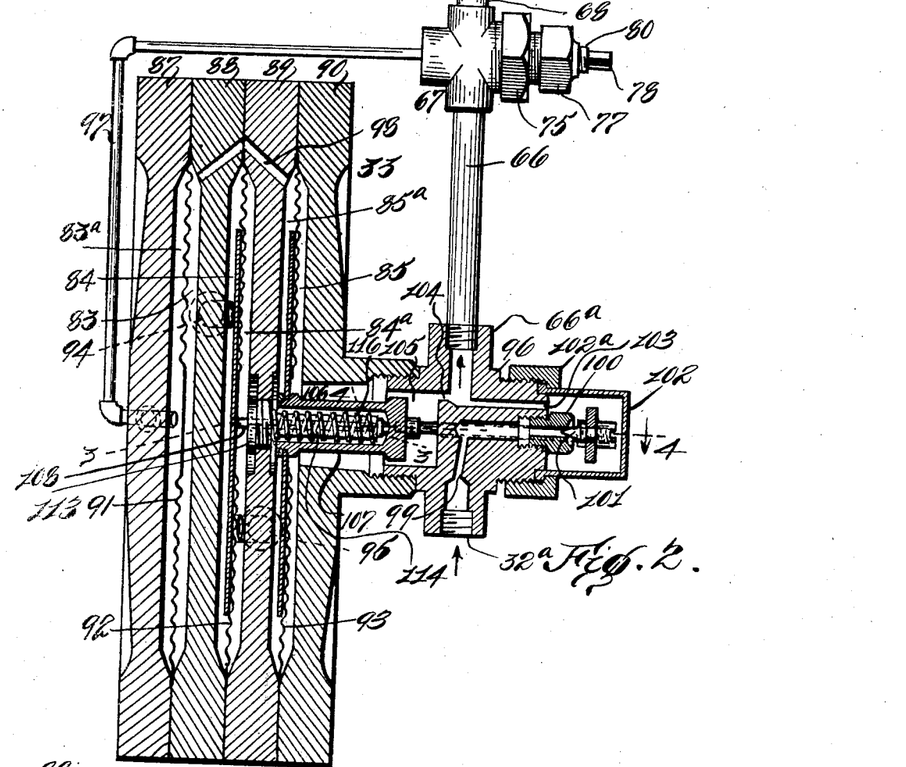
Fig. 2 is an enlarged transverse section of the preferred differential pressure device, on the line 2—2 Fig. 1, showing also a control valve.
Figure 3:
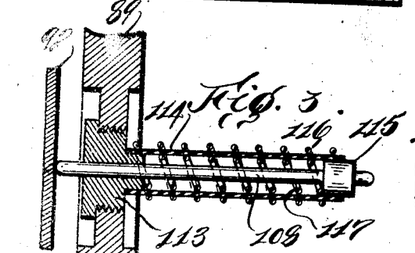
Fig. 3 is an enlarged detail section of said device on the line 3—3 Fig. 2, showing the preferred form of stuffing box.
Figure 4:
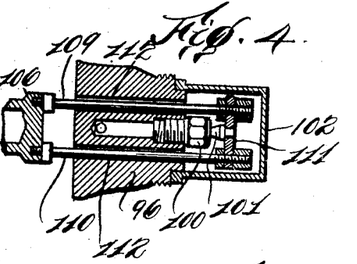
Fig. 4 is a section on the line 4—4 Fig. 2, showing a detail of said differential pressure device.

The differential pressure device 33 (Fig. 1) is shown in detail in Figs. 2, 3 and 4, and the object thereof is to operate a valve which maintains a proportionate flow of chlorin to the flow of water. The preferred construction of the said device as shown is predicated upon the use of six chambers, 83, 83$^a$, and 84, 84$^a$, and 85, 85$^a$, but the number of these chambers is not a fixed quantity. Four for instance may be used and substantially the same operation of the valve involved accomplished. As shown, said chambers are in part formed through the medium of four cast members or plates 87, 88, 89 and 90 which are suitably secured together, but the same ultimate object may evidently be accomplished by a different construction; as for instance embodying the chambers 83, 83$^a$ in one unit, chambers 84 and 84$^a$ in another unit, and chambers 85 and 85$^a$ in a third unit, all separated from each other, but suitably connected in the system, to function as will shortly appear. The adjacent walls of each of the pairs of the six mentioned chambers are composed of flexible septa, that between chambers 83, 83$^a$ may be formed by diaphragm 91, that between chambers 84, 84$^a$ by diaphragm 92, and that between the two other chambers by diaphragm 93. These diaphragms may of course be quite thin and sensitive if a reinforced construction such as above described is used.

High pressure and low pressure pipes 94, 95 respectively are connected with the barrel 25 of the Venturi connection and 26 of the Venturi throat, as shown in Fig. 1. These pipes may be provided with control valves 94$^a$, 95$^a$, and respectively lead to diaphragm chambers 84 and 84$^a$, so that the former is a high pressure chamber and the latter a low pressure chamber. Secured to the casing member 90 of the differential pressure device, as by a screw connection, is a head or coupling element 96. Said head is provided with a short pipe section 32$^a$ to which the pipe 32 leading from the three-way valve is connected. At the other side of the said head is a pipe connection 66$^a$ to which is connected pipe 66 which leads to the control valve 67. A branch pipe 97 leads from a point beyond the control valve 67 to diaphragm chamber 83$^a$, so that the drop in pressure across the said control valve is transmitted to said diaphragm chamber.

For reasons which will appear later, the diaphragm chambers 83, 85$^a$, are connected together by a passage 98 which extends through the members or sections 88, 89, and the said chambers are filled with a suitable liquid which is hermetically sealed therein. For all practical purposes it will be seen that the diaphragms 91 and 93 act as one.

Head or coupling member 96 is provided with a duct 99 which leads from the pipe 32, said duct extending in the direction of the central axis of the diaphragm chambers, and the terminal being constituted by a nipple 100 which is screwed into said head, and is provided with a seat for a needle valve 101. Said valve is located in a valve casing 102, which is preferably a hollow cap secured onto the head 96 by means of a nut 102$^a$. The chamber of said valve casing leads by means of a duct 103 in the head 96 to the pipe 66 to the control valve, while a duct 104 branches off in opposite direction and leads to a chamber extension 105 formed in the associated member 90 and head 96, and which is an extension of the diaphragm chamber 85. Consequently any pressure of the gas in ducts 103, 104 will be transmitted to the diaphragm 93. Attached to the central portion of diaphragm 93 is a hollow guard 106, into the hollow or chamber 107 of which there extends a reciprocatory rod or stem 108 which is guided through the member 89, its inner end being in contact with the diaphragm 92. To properly seat the engaging end of the said rod 108 against the guard 106, the inner end of the chamber 107 is tapered, and it will be seen that any movement of the diaphragm 92 toward said rod 108 will move the guard 106 and hence the diaphragm 93 in the same direction.

The outer end of the guard 106 is connected with the valve 101, to which end a pair of parallel rods or stems 109, 110, Fig. 4, are attached at their inner ends to said guard and at their outer ends are provided with a cross piece 111 which supports the valve 101, so that the needle point thereof extends toward the valve aperture of duct 99. The guard member 106 and the said two rods 109, 110 hold the valve central toward its seat, said rods being guided through holes 112 in the head or coupling member 96.

The described means for transmitting power to said valve preferably comprehends an improved construction of stuffing box. This is clearly illustrated in Fig. 3. It will be seen that the casing member 89 is provided with a screw plug 113, through which the stem or rod 108 is guided, and said plug is secured to one end of an elastic tube 114 preferably composed of rubber, the other end of said tube being secured to a collar 115 located on the rod or stem 108. The walls of the said rubber tube are supported by helical springs 116, 117, the former being coiled upon the exterior of said tube while the latter is located within said tube. The spring 116 prevents the bursting of the tube 114 while spring 117 prevents the collapse of said tube, and supports the rubber away from the rod 108. It will be seen that the elasticity of the tubing 114 will allow slight lateral motion of the rod with practically no friction, and that there can be no leak from the chamber 84ª into the gas chamber 85, inasmuch as the elastic tubing is impervious and covers the joint more tightly with increased pressure.

The pressure beyond the valve 67 is transmitted through a diaphragm chamber 118 to a gage 119 Fig. 1, so that the pressure of the gas at this point can be read off.

The operation of the described differential pressure device and its valve, and the control valve 67 so far as its function is allied thereto, will now be described. In the construction described, the two chambers containing the hermetically sealed liquid may theoretically be considered as one as before stated, but practically there are two of them so that there can be no chance for a leak of gas from the gas side of said device to the water side thereof, or vice versa. The drop in pressure of the gas across the control valve 67 will increase with increased flows of gas, and in a like manner the drop in pressure across the Venturi throat will increase with increased flows of water. When the control valve 67 has been set for a particular flow of chlorin to a particular flow of water, an equilibrium will be established between drops in pressure across the said control valve and said Venturi throat. If there should be an increase in the flow of water, this equilibrium will be broken and the differences in pressure in the diaphragm chambers 84, 84ª which contain water will act to deflect or press the diaphragm 92 upon the rod 108 thereby operating the needle valve 101 to produce a larger opening for the gas as it flows from pipe 32 into pipe 66, and consequently more gas is allowed to flow across the control valve 67. When the diaphragm 92 has been forced forward far enough to allow sufficient gas passing the control valve 67 to create a drop in pressure across said valve in proportion to the drop in pressure across the Venturi throat, there will be proportional flows of chlorin and water. Should the flow of water become less, the said diaphragm will act in the same way, it being forced back until equilibrium is established.

The line connections 135, 142 Fig. 1 have not been referred to, but it is obvious that should there be greater or less back pressure of chlorin in said line or greater or less pressure in the chlorin flasks or tanks 27, 28, the valve 101 is automatically operated as follows: For greater flows of chlorin diaphragm 93 will be forced forward toward the valve 101 because of the increased drop in pressure across the control valve 67. This pressure will be transmitted to the diaphragm 91 by means of the hermetically sealed body of liquid in chambers 85, 85ª, and there will be established a flow of chlorin across the valve 67 such as to give equilibrium of pressures in chambers 84ª and 85. This will bring the diaphragm 91 in equilibrium and thus establish a drop in pressure across the valve 67, in proportion to the drop in pressure across the Venturi connection, thereby giving proportional flows of gas and water.

A valve 95ᵇ arranged between the pipes 94 and 95 allows the pressures in the chambers of the differential pressure device, Fig. 4, to be equalized by opening it and shutting off valves 94ª and 95ª, thereby enabling valve 101 to be adjusted.

*The flow-meter.*

Located in a break in the pipe 68 is a flow meter, which is shown in detail in Figs. 8 and 9. This is a device for metering and measuring gases, which is hydraulic in principle and of great simplicity and permanent accuracy. The manometer thereof, shown in Fig. 8 will first be described. This is located in the pipe 68 between a fixed orifice 120 (Fig. 9) and the control valve 67. The two sections of the pipe 68 are joined to a head or body 121, and communicating with the pipe 68 is a branch passage 122 in said head, which also communicates with a tube 123 which is closed at its lower end to form a pocket. Extending into this closed tube 123 is a tube 124 which is open from end to end, its upper end being fixed in a bore in the metal head 121. The lower end of the inner tube 124 terminates a suitable distance above the closed lower end of the outer tube 123, so that a body of liquid 125 in the lower end of the outer tube may be caused to move in the inner tube 124. The cross sections of the two tubes differ materially as the inner tube is considerably smaller than the outer tube.

Preferably the said tubes 123, 124 are composed of glass, because chlorin in the presence of most liquids has a very corrosive action on metals, and it is found that glass is about the only practical material to use for containing a liquid body such as 125, which is not acted upon by chlorin, nor is volatile, but is inert to glass. By means of the inclosed type of manometer involved herein, no part of the metal of the head 121 comes in contact with the acid. The head 121 is provided with a lateral passage 130 which leads into the lower end of a chamber 131 fixed on top of the head, said chamber being substantially in line with the tubes 123, 124. Located in the said chamber is a receptacle or vessel 132 in the general form of an inverted bell, and its lower end is provided with a neck 133 which is inserted into the upper end of the head so that the upper end of the inner glass tube 124 may enter it. The said receptacle 132 and its neck 133 are also preferably composed of glass for the reasons given.

Before describing the operation of the manometer, the orifice 120 and its mounting shown in Fig. 9 will be described. This device preferably involves the head 121 of the manometer, although it may be made as a separate part and comprises in addition to said head and the aforesaid fixed orifice 120, a glass chamber or cap 126 which is suitably mounted on the head 121 so as to cover the orifice and provide means for inspecting the orifice at any time without interfering with the flow of gas. The fixed orifice 120, preferably made of glass, is located at the end of a short pipe section 127 which is inserted in the head and connects with the pipe 68, so that the described manometer is located in the line ahead of said fixed orifice. There is an annular passage 128 around the pipe section 127 which leads from the fixed orifice 120 to the outlet 129 to the line. From this outlet there extends the before mentioned lateral passage 130 to the manometer chamber 131, so that the said connection 130 is after the orifice 120 in the direction in which the flow of gas through the line occurs.

The operation of the described associated manometer and fixed orifice is as follows: When a flow of gas occurs through the fixed orifice 120, there will be a drop in pressure across this orifice, said drop being communicated to the manometer and being readable from a scale $s$ back of the glass tubes. The greater pressure on the surface of the body of liquid 125 in the outer tube 123 causes the liquid to rise in the smaller tube 124, and the difference in cross area of these tubes being comparatively great, a small downward deflection of the liquid in the outer tube will cause a comparatively large rise of the liquid in the inner tube. This deflection is a measure of the drop in pressure across the orifice and consequently an indication of the amount of chlorin flowing through the line, being readable from said scale. If for any reason there should be an excessive flow of chlorin tending to blow the liquid out of the lower part of the outer tube 123, the liquid will be forced up through the inner tube 124 and into the open receptacle or vessel 132. As this receptacle has a capacity greater than the amount of liquid employed, it will prevent any of the liquid from coming in contact with the metal parts and being of glass will prevent corrosion. Said receptacle will also hold the liquid and prevent it from running down into the lateral passage 130 after the fixed orifice 120. When the extreme flow of gas ceases, the liquid will flow back into the lower chamber or pocket of the outer glass tube 123. The glass cap or chamber 126 of the flowmeter permits any obstruction of the fixed orifice 120 to be seen, which obstruction might interfere with the accuracy of the apparatus. The upper chamber 131 of the manometer should be provided with a filling orifice located above the open upper end of the receptacle 132, said orifice being closed as by a suitable plug 131ª. This enables the charge of acid to be supplied to the outer tube 123.

The fixed orifice 120 may be replaced by a body 134 of porous material such carborundum, emery, etc., as shown in Fig. 9ª. This may be secured on the exit end of the tube 127 by means of a screw cap 134ª.

The object of said porous medium is to offer resistance to the gas, so that the difference in pressure of said gas may be measured before and after it passes therethrough.

*Back pressure valve and check valve.*

Figure 13:
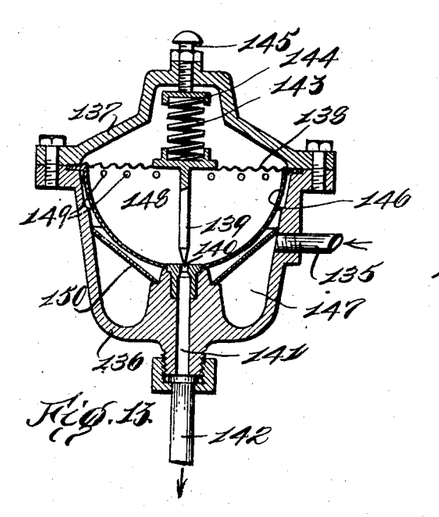
Fig. 13 is a vertical section of a back pressure valve, such as shown in line of piping at the left of Fig. 1.

The gas line includes a pipe 135 which is connected with the outlet 129 of the flowmeter, and delivers gas to the casing of the back pressure valve device shown in detail in Fig. 13. This device comprises two casing sections 136, 137 which are rigidly fastened together so as to clamp a diaphragm 138 in position in said casing. This diaphragm may be reinforced as before described. In the said casing there is located a needle valve 139 carried by the said diaphragm, and said valve is adapted to control the orifice through a valve seat 140 at the upper end of a duct 141 in the casting 136, said duct being connected with a pipe or tube 142 preferably of silver (see also Fig. 1). Located above the diaphragm 138 is a spring 143, the lower end of the spring being seated upon the central portion of the diaphragm while the upper end of the spring is positioned in a seat plate 144, upon which bears a set screw 145 which is screwed into the central portion of the casting 137. Clamped between the two castings 136, 137 is a silver cup 146 which is located at the underside of the diaphragm 138. This cup divides the space below the diaphragm into a lower chamber 147 communicating directly with the gas inlet pipe 135 and an upper chamber 148 within the cup, and extending to the valve seat 140 which is located at the apex of the cup. There are a plurality of holes or perforations 149 located in the rim of the cup 146, and through these the gas passes in small jets from the lower chamber 147 into the upper chamber 148. Preferably between the pipe 135 and the cup 146 there is located in the chamber 147 a screen 150 of suitable filtering material. The outer edge of the said screen is in contact with the casing section 136 while its apex closely surrounds the upwardly projected central part of section 136. It will be seen that the cup 146 serves to trap a slight leak of water from the silver tube 142 should such occur when the chlorin is introduced into water under pressure and that the filter 150 serves to strain out any foreign particles in the gas which might lodge in the valve seat 140 and interfere with the proper operation of the valve. In operation, the spring 143 is adjusted by the set screw 145 so as to hold the needle valve against the valve seat at a predetermined tension. Gas passing into the lower chamber 147 and thence into the upper chamber 148, through the perforations 149, will act to raise the valve 139 when a sufficient pressure is produced. Said back pressure valve will act somewhat in the nature of a check valve.

Temperature compensating valve.

Figure 14:
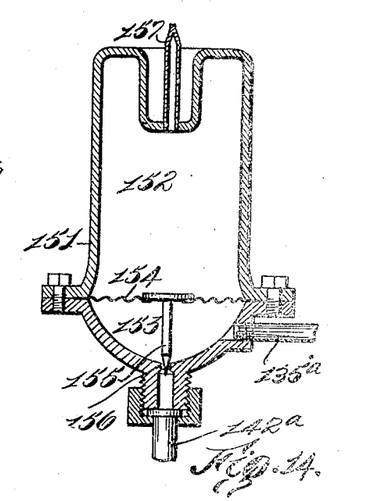
Fig. 14 is a vertical central section of a modification of such valve, adapted for automatically holding at a constant density a gas flowing in a pipe irrespective of surrounding conditions of temperature and pressure.

This valve may be considered as a modification of the back pressure valve just described, although the construction is very different, and the operation only partly similar. This device is shown in Fig. 14. The pipe 135ª corresponds with the pipe 135 and pipe 142ª with pipe 142 in Fig. 1. A casing 151 is provided comprising an upper chamber 152 and a lower chamber 153, formed by casting sections which are permanently secured together so as to clamp a diaphragm 154 within them. This diaphragm constitutes the septum between the two chambers 152, 153, and being flexible, any differences of pressure in the two chambers will be transmitted to the diaphragm. Said diaphragm carries a needle valve 155 which is adapted to work against a valve seat 156 located in the lower chamber 153 at a point intermediate of the pipes 135ª and 142ª. The chamber 152 is of greater capacity than the chamber 153 and is provided at the top with an inlet piece 157 for air, which is introduced into the chamber 152 under pressure so that the said chamber is filled with air of constant density, after which the said inlet piece 157 is sealed, thereby hermetically sealing the chamber 152. The said device is adapted to maintain a constant flow of gas through the orifice of the valve seat 156 at a constant and predetermined density, regardless of varying temperatures, varying rates of flow or varying back pressures from the point of application of the gas to the water or sewage. This device is based upon the principle that a constant drop in pressure through an orifice will give a constant quantity of gas provided the density is constant, regardless of varying pressures or surrounding temperatures. This constant density is maintained by the described device as follows: The chlorin gas from the fixed measuring orifice 120 before referred to is admitted into the lower chamber 153 of the density compensating valve, and when the pressure of gas in said chamber is sufficiently great, it will cause the diaphragm 154 to rise and allow the gas to escape to the point of application at a set rate. Should there be a change in temperature, the air under normal conditions being held at a constant volume will change in pressure. This would cause a corresponding change in the pressure of the chlorin flowing through the measuring orifice which would counterbalance any change in density due to change of temperature of the gas itself. This gas being constant in density would give true readings in drop in pressure across the orifice when such readings were once determined. The said valve will also act somewhat in the nature of a check valve.

Chlorin diffusing device.

Figure 15:
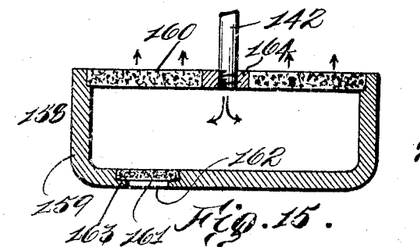
Fig. 15 is an enlarged central section of the device preferably employed for saturating with water, and diffusing and dissolving the gas where it passes into the water or sewage to be treated.

One of the objects of this device is to secure distribution and the quick solubility of chlorin in water, and it is shown in detail in Fig. 15, while the manner in which it may be associated in the system described is shown in Fig. 1. In the latter figure the water main is shown as provided with a casing 25ª behind the Venturi connection. The silver tube 142 extends through the removable head 25ᵇ of said casing, and the chlorin diffusing device is attached to the lower end of the tube 142 so as to be located within the chamber of said casing. Its position in the casing should be slightly above the bottom thereof as shown. The said diffusing device consists of a hollow head 158 comprising a cup or dished body 159, which may be composed of earthenware material such as porcelain. The upper part of the dished body 159 is closed partly by a top plate or disk 160 which is preferably but not necessarily composed of porous material such as carborundum, emery, alundum, or the like, while there is a bottom closure disk 161 of similar material but of finer porosity than that of the upper disk 160. The smaller bottom disk is placed over the bottom aperture 162 of the dished body 159, the wall of which is provided with a peripheral groove to furnish a seat 163 for disk 161. Preferably the silver tubing 142 is connected with the hollow head of the diffusing device by means of a silver bushing 164.

The operation of the described chlorin diffusing device is as follows: The head 158 is immersed in water, as in the water main shown in Fig. 1, and as soon as the water strikes the porous disks, the pores thereof take up water and become saturated because of capillary action. The gas under pressure, passing into said head from the tube 142 is forced up through the pores of the upper disk 160, against the capillary attraction of the water, in very minute bubbles, whereby the chlorin gas is diffused into the body of water surrounding the diffusing head. As these bubbles are in the act of passing through the upper porous disk 160, they take up a certain amount of the water and reach the main body of water to be purified, in a practically saturated condition, where because of this saturation and the fineness of the bubbles they go into solution immediately over the comparatively large upper surface of the porous upper disk. If said disk were dry, the chlorin gas would go through in comparatively large bubbles in a dry state and would be less easily dissolved. The lower porous disk 161 allows any water which may collect in the dished body 159 to be forced through the said disk. When the interior of the hollow body 158 contains no water, no gas will escape through the lower porous disk 161 for the reason that this disk being of a finer degree of porosity than the upper disk, offers more resistance to the passage of the gas; also this disk being at a lower level than the upper disk would require a greater pressure to force gas through it from the same source.

Figures 17, 18:
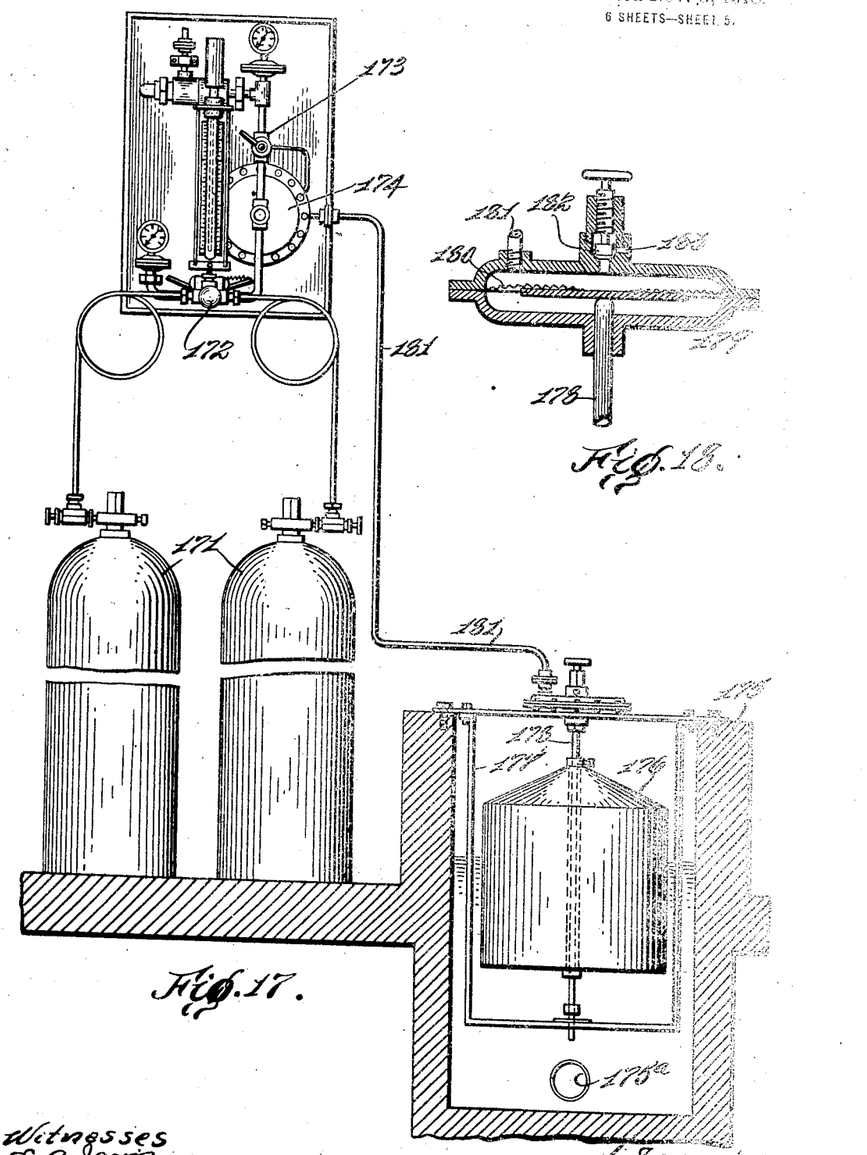
Fig. 17 is a front elevation of a modification of the complete apparatus, in which a float over a submerged orifice is shown, the same taking the place of the Venturi connection shown in Fig. 1.
Fig. 18 is an enlarged section of the diaphragm device used in Fig. 17 in connection with the float.

A modification of the apparatus is shown in Figs. 17 and 18, in which the automatic control device is connected up to a float over an orifice instead of to a Venturi throat as in Fig. 1. Referring to aforesaid figures, the support corresponding to that shown in Fig. 1 carries various accessories similar to those shown in Fig. 1. The two chlorin tanks 171 are adapted similarly to the first form of the apparatus to control a three-way valve such as in Fig. 5, in the same way as before. Beyond this three-way valve 172, there is a control valve in the gas line which may be similar to that shown in Fig. 12 and before said control valve is reached there is connected with the gas line a differential pressure device 174 which may be similar to that shown in Fig. 2. These parts are associated with suitable accessories such as before described and all of which may be mounted upon the support 170. At the lower part of Fig. 17 there is a reservoir or tank 175 having an orifice 175ᵃ, and which is adapted to contain water which supports a float 176 of suitable cross section. This float may be guided as by means of a frame 177 and actuates a rod 178, which in turn is in operative engagement with the diaphragm 180 of a pressure device 179, shown in detail in Fig. 18. The upper chamber of pressure device 179 communicates by means of a sealed pipe 181 with the pressure chamber 84 of the differential pressure device shown in Fig. 2. In this case the pipe 181 takes the place of the pipe 94 shown in said figure and in Fig. 1. Also in this modification, the chamber 84ᵃ of the device of Fig. 2 is open directly to the air so as to be subjected to atmospheric pressure.

The hydraulic formula for the discharge of liquid through an orifice, such as 175ᵃ, with varying head is practically the same as for the discharge of the flow of liquid through a Venturi throat such as in Fig. 1. By means of the described modification, the variation of head over orifice such as 175ᵃ can be transmitted to chamber 84 (Fig. 2) in the differential pressure device, indicated by 174 in the present modification, so that there can be maintained a proportion in the flow of chlorin gas through the control valve 173 and the discharge of water through the said orifice. The float 176 being hermetically sealed and of constant cross area, transmits its motion to the diaphragm 180. Now if there is an increase of water for the orifice 175ᵃ, there must be an increased head. This increased head will cause an increased upward thrust of the float 176 upon the diaphragm 180. This thrust is in turn communicated by means of the column of air in pipe 181 to the diaphragm 92 (Fig. 2), which forces the valve stem outwardly and opens the valve 101 so as to allow more gas to flow through the control valve 173 (Fig. 17) until the drop in pressure across the said control valve is proportional to the increased thrust of the float. The apparatus described is associated with a line of gas discharge piping and concomitant parts, which piping is terminated by a gas diffuser as in Fig. 15. The latter device may treat the water which issues back of the orifice 175ᵃ, in obvious manner.

Figures 19, 20:
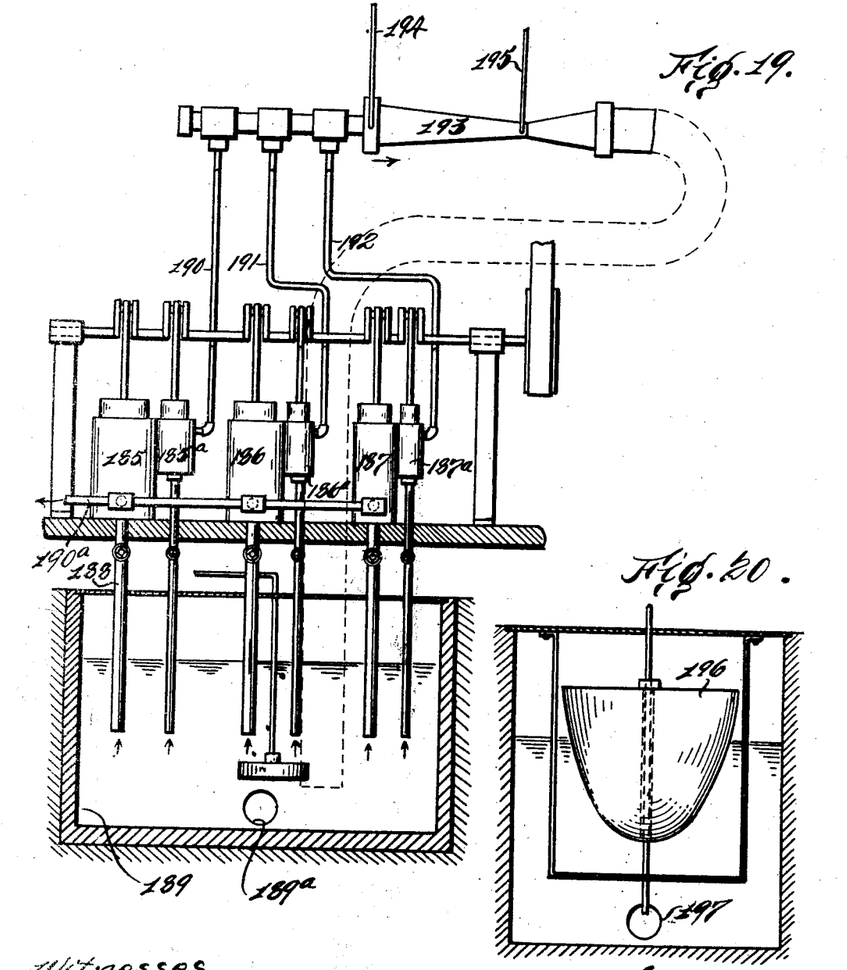
Fig. 19 is a side elevation of a modification of parts of the apparatus showing a plurality of pumps connected with a water or sewage reservoir at the point of application of the chlorin, and a Venturi connection for obtaining a difference in pressure and through which the treated water or sewage may or may not pass.
Fig. 20 is a modification in which the float is shown in connection with a weir.

In Fig. 19 a still further modification is illustrated in which the automatic gas regulating apparatus such as before described is connected with a small venturi which in turn is connected to a number of pumps so that the drop in pressure across the venturi will be a measure of the amount of water pumped. In said figure there is shown a series of three large pumps 185, 186 and 187, with which are respectively associated smaller pumps 185ᵃ, 186ᵃ and 187ᵃ. Where two pumps or more are operating simultaneously, there must be a definite ratio in the size of the small pump to the corresponding large pump, so that if the large pumps 185, 186 and 187 gradually decrease in size as illustrated, the small pumps 185ᵃ, 186ᵃ and 187ª also decrease in size. The suction pipes 188 connected with said pumps extend into a body of water in a reservoir or tank 189 having an orifice 189ª if desired. The pipes 190, 191 and 192 leading away from said pumps 185ª, 186ª, 187ª, are connected up to a venturi 193, with the barrel of which is connected a pipe 194, and with the throat thereof there is connected a pipe 195, while the larger pumps 185, 186, 187, discharge through pipe 190ª to any desired point. Said pipes 194, 195, will permit the transmission of differences of pressure to the differential pressure device such as shown in Fig. 2. The water flowing through the venturi may be sent back to the reservoir 189 through a connection indicated in dotted lines, whereby a closed water circulating system is provided, enabling the water to be used over and over again, and to be used as a separate system from the water which is actually treated with the chlorin. Of course also the chlorin diffuser may be introduced into the body of water 189 as shown in full lines in Fig. 19, in which case the dotted connection from the venturi back to the reservoir is omitted.

It is clear that with increased or decreased speed of the large pumps 185, 186 and 187 there will be a proportionate increase or decrease of the amount of water pumped by the small pumps, the total of which will be forced through the Venturi meter 193 in common with them. If the speed of the large pumps should be doubled, the amount of water forced through the venturi will also double and the drop in pressure will be proportionate to the amount of water pumped, and as the said venturi is connected up to the gas regulating apparatus, there will be a proportionate flow of gas to the water pumped.

A slight modification is shown in Fig. 20 where the automatic device is operated by means of a float 196 whose position is determined by the head over a weir, through an orifice such as 197. In this case the float must be of a special shape such as shown, for instance so as to give a proportional thrust to the automatic valve and so maintain a proportionate flow of chlorin and water treated, varying as the water varies in head over the weir.

The operation of the modification shown in Fig. 20 is practically the same as for the apparatus shown in Fig. 17.

The invention covers the automatic controlling of the flow of any gases or liquids by the flow of any other gases or liquids proportionately. Certain features in this system may obviously be adapted to other systems, as for instance those covered by copending applications Serial Numbers 17,123 and 17,124, filed by us on even date herewith.

Certain devices novel per se and in combination and certain processes are disclosed herein which will be made the subject of separate applications.

It is obvious that the invention is susceptible of modification, as parts may be omitted, parts added, and parts substituted without departing from the spirit and scope thereof as expressed in the claims.

What we claim as new is:—

1. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, and a differential pressure device connected with said pressure means and with said conducting means at both sides of said valve, said differential device having a valve controlling the passage of said second flowing substance through said control valve.

2. In apparatus of the class described, the combination of a main provided with a Venturi connection, and constituting means for establishing a difference in pressure of a flowing substance, conduits leading separately from the barrel and throat of said venturi, conducting means for a second flowing substance for conducting it to a substance to be treated, a control valve located in said conducting means for causing a drop in pressure of said second flowing substance, a differential pressure device connected with said pressure means through said conduits and with said conducting means at both sides of said valve, said differential device having a valve controlling the passage of said second flowing substance through said control valve.

3. In apparatus of the class described, the combination of means for establishing a difference in liquid pressure through the medium of the liquid to be treated, a source of gas supply comprising two charged cylinders, gas conducting means for conducting said gas to said liquid and having branch conduits leading separately from said cylinders, a control valve located in said conducting means for causing a drop in pressure of said gas, a differential pressure device connected with said liquid-pressure means and with said conducting means at both sides of said valve, said differential device having a valve controlling the passage of gas through said control valve, a valve for controlling said branch conduits, and means for automatically operating said latter valve by the emptying of one of said cylinders.

4. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, said valve comprising a valve casing provided with ducts and a differential-screw needle valve for controlling the passage of said second flowing substance through said ducts, and a differential pressure device connected with said pressure means and with said conducting means at both sides of said valve, said differential device having a valve controlling the passage of said second flowing substance through said control valve.

5. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance and a differential pressure device including two chambers separated by a diaphragm, the said chambers being separately connected with the high and low sides respectively of said pressure means and with said conducting means at both sides of said valve, said differential device having a valve controlling the passage of said second flowing substance through said control valve according to the drop in pressure of said pressure means.

6. In apparatus of the class described, the combination of means for establishing a difference in pressure of a flowing substance, conducting means for a second flowing substance for conducting it to a substance to be treated, a control valve located in said conducting means for causing a drop in pressure of said second substance, a differential pressure device connected with said pressure means and with said conducting means at both sides of said valve, said differential device having a valve controlling the passage of said second substance through said control valve, and means for preventing leakage of said second substance to the side of said differential pressure device for the first said flowing substance and for transmitting power to said valve of said device with reduced friction.

7. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, and a differential pressure device connected with said pressure means and with said conducting means at both sides of said valve, said differential device having a constricted passage and a needle valve controlling said passage and the passage of said second flowing substance in said control valve.

8. In apparatus of the class described, the combination of means for establishing a difference in pressure of a flowing substance, conducting means for a second flowing substance for conducting it to a substance to be treated, means for indicating the pressure of said second substance as it comes from said source of supply, a control valve located in said conducting means for causing a drop in pressure of said second flowing substance, and a differential pressure device located between said indicating means and said control valve, and connected with said pressure means and with said conducting means at both sides of said valve, said differential device having a valve contrtolling the passage of said second flowing substance through said control valve.

9. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, a differential pressure device connected with said pressure means and with said conducting means at both sides of said valve, said differential device having a valve controlling the passage of said second flowing substance across said control valve, and means for indicating the reduced pressure of said second substance flowing through the said control valve.

10. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, a differential pressure device connected with said pressure means and with said conducting means at both sides of said valve, said differential device having a valve controlling the passage of said second flowing substance through said control valve, and a metering and measuring device for said second substance, located between said control valve and the point of application of said second substance to said substance to be treated.

11. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, a differential pressure device connected with said pressure means and with said conducting means at both sides of said valve, said differential device having a valve controlling the passage of said second flowing substance through said control valve, and a flow meter for said second flowing substance operable through a drop in pressure of said second substance and located between said control valve and the point of application of said second substance to said substance to be treated.

12. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, a differential pressure device connected with said pressure means and with said conducting means at both sides of said valve, said differential device having a valve controlling the passage of said second flowing substance through said control valve, and a back pressure valve located ahead of the point of application of said second flowing substance to said substance to be treated, and comprising a diaphragm regulated valve-proper.

13. In apparatus of the class described, the combination of means for establishing a difference in liquid pressure through the medium of the liquid to be treated, a source of gas supply, gas conducting means for conducting said gas to said liquid, a control valve located in said conducting means for causing a drop in pressure of said gas, a differential pressure device connected with said liquid-pressure means and with said conducting means at both sides of said valve, said differential device having a valve controlling the passage of gas through said control valve, and means for discharging said gas into said liquid comprising a porous body through which said gas is diffused into the said liquid.

14. In apparatus of the class described, the combination of means for establishing a difference in pressure of a flowing substance, conducting means for a second flowing substance for conducting it to a substance to be treated, a control valve located in said conducting means for causing a drop in pressure of said second flowing substance, a differential pressure device connected with said pressure means and with said conducting means at both sides of said valve, said differential device having a valve controlling the passage of said second flowing substance through said control valve, and means for metering and measuring said second flowing substance before it is discharged into said substance to be treated, comprising a flow meter associated therewith and provided with a fixed orifice to measure the drop in pressure across it.

15. In apparatus of the kind described, the combination of means for establishing a differential pressure in a flowing fluid; means for furnishing a supply of gas under pressure; a variable constricted passage through which said gas flows whereby the proportion of gas to flowing fluid may be fixed at will; and means for varying the flow of gas through said passage without altering the predetermined fixed proportion of gas to fluid, said means being connected to, and dependent for its operation upon, the means for establishing a differential pressure in the flowing fluid, and being adapted to preserve said proportion however the head pressures of the gas and fluid may vary.

16. In combination with the elements specified in claim 15; means for introducing the gas into a fluid to be treated; and means located in the path for said gas to the fluid, adapted to maintain the gas under constant pressure at that point.

Signed at New York, N. Y., this 22nd day of March, 1915.

CHARLES F. WALLACE.
MARTIN F. TIERNAN.

Witnesses:
GEO. L. WHEELOCK,
BEATRICE MIRVIS.